(12) United States Patent
Liu et al.

(10) Patent No.: US 7,487,947 B2
(45) Date of Patent: Feb. 10, 2009

(54) MOBILE POWER TOOL STAND

(75) Inventors: Chia-Sheng Liu, Chiayi County (TW); Ming-Feng Liao, Taichung County (TW)

(73) Assignee: Durq Machinery Corp., Taichung (TW)

( * ) Notice: Subject to any disclaimer, the term of this patent is extended or adjusted under 35 U.S.C. 154(b) by 492 days.

(21) Appl. No.: 11/241,943

(22) Filed: Oct. 4, 2005

(65) Prior Publication Data

US 2007/0012826 A1    Jan. 18, 2007

(30) Foreign Application Priority Data

Jun. 29, 2005    (TW) .............................. 94210934 U

(51) Int. Cl.
*B52B 1/00* (2006.01)
(52) U.S. Cl. .................. 248/439; 248/284.1; 280/47.34
(58) Field of Classification Search ............. 248/282.1, 248/278.1, 276.1, 285.1, 284.1, 371, 166, 248/439; 280/47.34, 47.35, 30, 639, 641; 269/901; 108/115, 118, 131, 132, 133
See application file for complete search history.

(56) References Cited

U.S. PATENT DOCUMENTS

| | | | | |
|---|---|---|---|---|
| 1,982,205 A * | 11/1934 | Doman | ....................... | 108/117 |
| 4,127,260 A * | 11/1978 | Hickman | ..................... | 269/139 |
| 5,087,013 A * | 2/1992 | Gress et al. | ................. | 248/676 |
| 6,152,462 A * | 11/2000 | Barrett | ........................ | 280/30 |
| 6,578,856 B2 * | 6/2003 | Kahle | .......................... | 280/30 |
| 7,077,421 B2 * | 7/2006 | Wu | ............................. | 280/645 |
| 7,255,355 B2 * | 8/2007 | Chisholm et al. | ............ | 280/30 |
| 7,278,646 B2 * | 10/2007 | Chuang | ................... | 280/47.34 |
| 2005/0120922 A1 * | 6/2005 | Brooks | ...................... | 108/118 |
| 2005/0199768 A1 | 9/2005 | Tam et al. | | |
| 2006/0075943 A1 * | 4/2006 | Chen et al. | .................. | 108/115 |

* cited by examiner

*Primary Examiner*—J. Allen Shriver
*Assistant Examiner*—Steven Marsh
(74) *Attorney, Agent, or Firm*—Bacon & Thomas, PLLC

(57) ABSTRACT

A mobile power tool stand includes two transverse bars for holding a power tool thereon, two first legs respectively pivoted to the transverse bars, two links respectively pivoted to the transverse bars, two second legs respectively pivoted to the first legs and the links for allowing the mobile power tool stand to be set between a received status where the first legs and the second legs are received together, and an extended status where the bottom ends of the first and second legs support the whole structure of the stand on the floor, and a locking structure for selectively locking the mobile power tool stand between the received status and the extended status.

16 Claims, 9 Drawing Sheets

MOBILE POWER TOOL STAND

BACKGROUND OF THE INVENTION

1. Field of the Invention

The present invention relates to a stand for power tool (such as table saw) and more particularly, to a mobile power tool stand that can conveniently be set between a received status and an extended status with less effort.

2. Description of the Related Art

FIG. 1 shows a stand 2 for supporting a table saw 1. The stand 2 comprises a table board 3 to which the table saw 1 is fastened, a frame 4 fixedly fastened to the bottom side of the table board 3, a first retaining device 4a provided at one side of the frame 4, a pair of first legs 5 each having one end respectively pivoted to the frame 4, and the other end provided with a second retaining device 5a, a pair of second legs 6 respectively pivoted to the first legs 5, a handle 6b fastened to one end of each of the second legs 6, a locating pin 6a provided at each second leg 6 and spaced between the handle 6b and the pivoted joint between the first legs 5 and the second legs 6, and a pair of wheels 7 respectively pivoted to the frame 4. FIG. 1 shows the stand 2 set in the extended status to support the table saw 1 in the operation position where the first retaining device 4a is fastened to the locating pin 6a at each second leg 6. FIG. 2 shows the stand 2 set in the received status where the first legs 5 and the second legs 6 are closely attached together, and the second retaining device 5a is fastened to the locating pin 6a.

The aforesaid stand 2 is functional. However, when changing the stand 2 from the extended status shown in FIG. 1 to the received status shown in FIG. 2, it requires the assistance of two persons to overcome the weight of the table saw 1. If one person wishes to receive the stand 2 from the extended position, the person must have one leg stopped at the second legs 6 to provide a fulcrum, and then pull the handle 6b upwards to force the wheels 7 into contact with the floor. However, the table saw 2 and the stand 1 may fall to the ground suddenly if the person cannot bear the weight of the table saw 1 during the action of receiving the stand 2 to tilt the table saw 1. Therefore, it is not recommended to receive the stand 2 by one person.

Further, because the second retaining device 5a lays open to the outside during the status shown in FIG. 1, a passing-by person may stumble over the second retaining device 5a.

Therefore, it is desirable to provide a mobile power tool stand that eliminates the aforesaid drawbacks.

SUMMARY OF THE INVENTION

The present invention has been accomplished under the circumstances in view. It is therefore the main object of the present invention to provide a mobile power tool stand, which is easy to operate and which is safe and stable in use.

To achieve this object of the present invention, the mobile power tool stand comprises two transverse bars for holding a power tool on a top side thereof; a pair of first legs each having a fulcrum respectively pivoted to the transverse bars; a pair of links each having a fulcrum respectively pivoted to the transverse bars; a pair of second legs each having a first pivot point respectively pivoted to the links and a second pivot point respectively pivoted to the first legs; a locking structure comprising a first locating member provided at the first legs, and a first retaining device provided at the second legs for fastening to the first locating member when the first legs are received to the second legs.

DETAILED DESCRIPTION OF THE INVENTION

Figure 1:
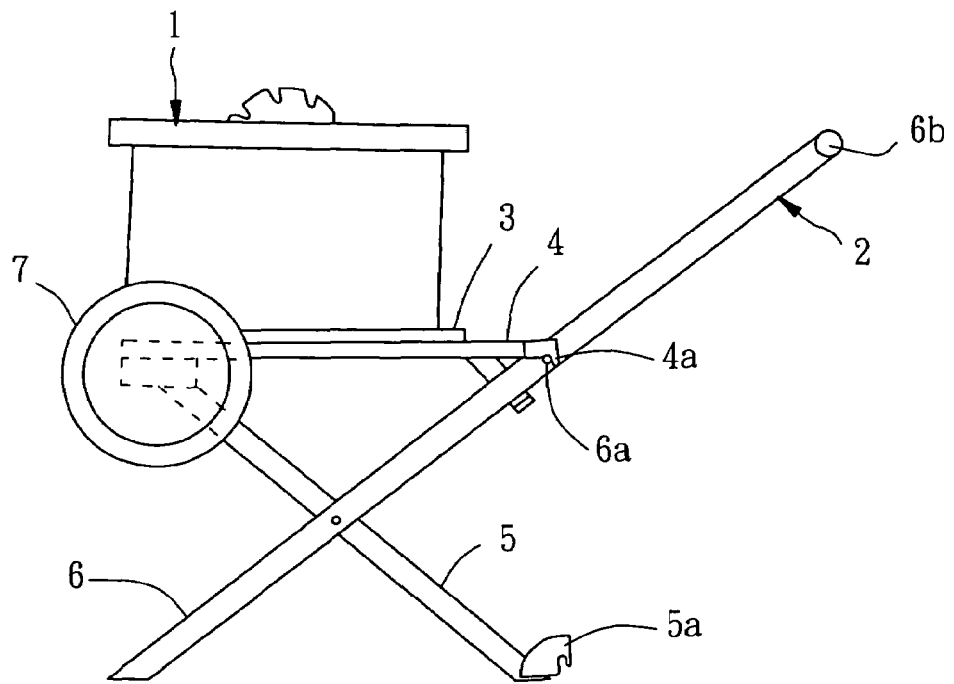
FIG. 1 is a schematic drawing showing the extended status of a mobile table saw stand according to the prior art.
Figure 2:
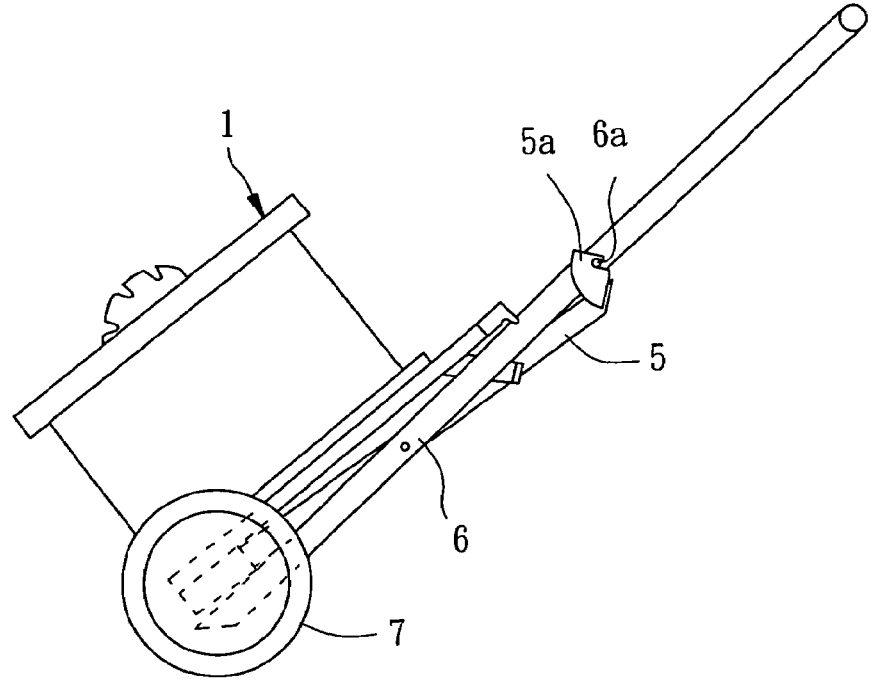
FIG. 2 corresponds to FIG. 1 showing the received status of the mobile table saw stand.
Figure 3:
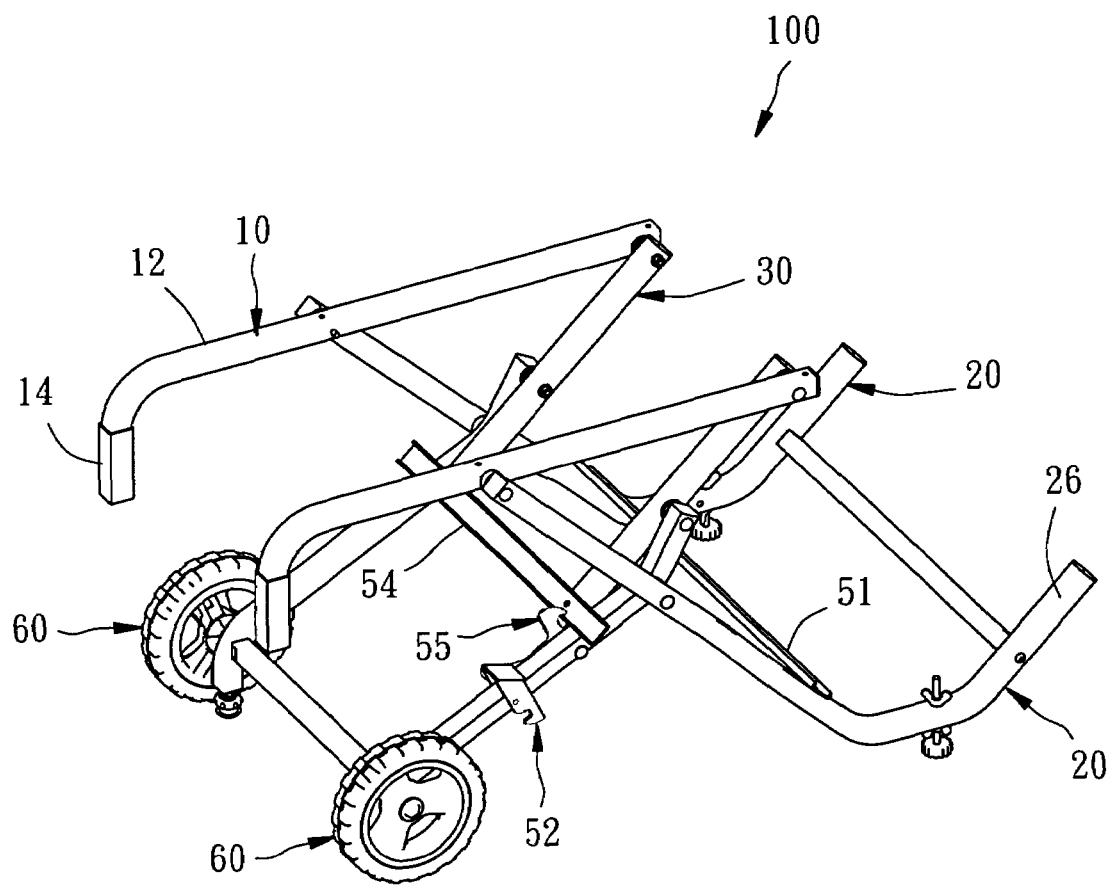
FIG. 3 is a perspective view of a mobile power tool stand according to the present invention.
Figure 4:
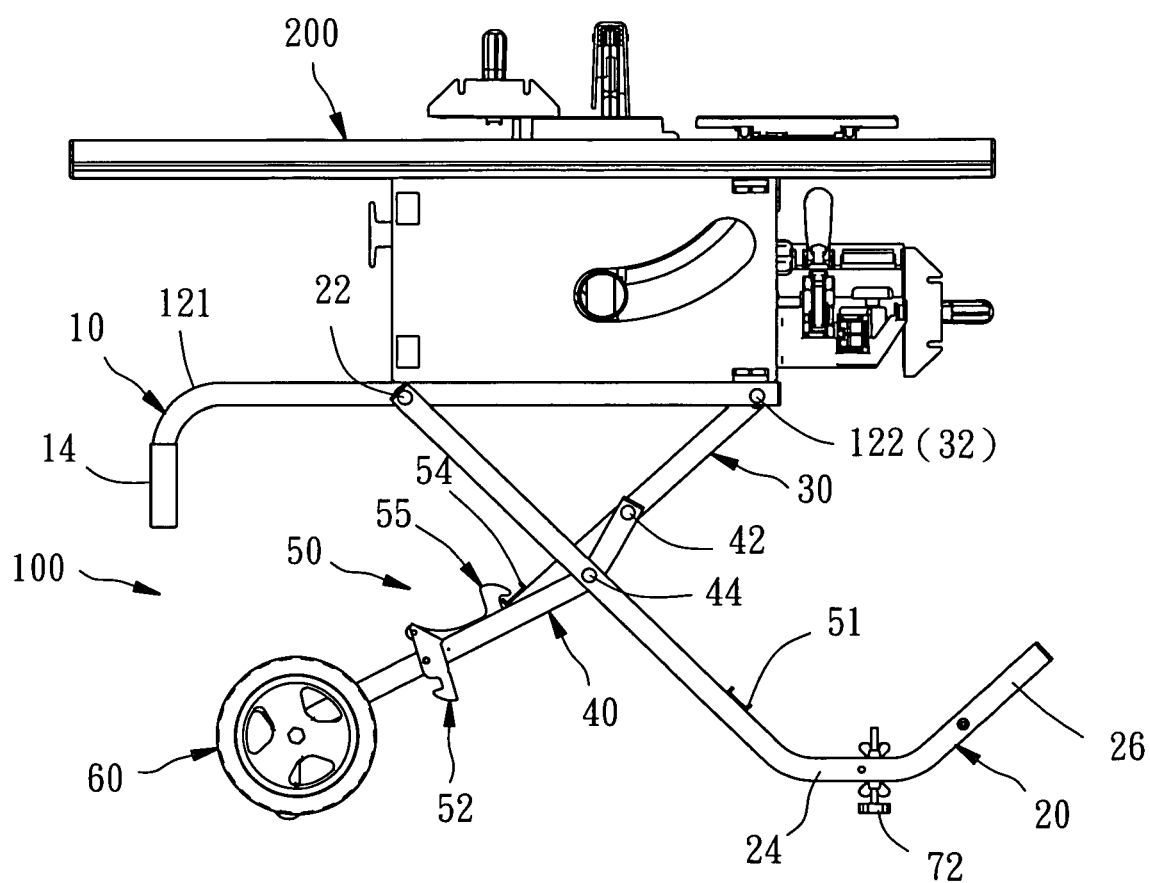
FIG. 4 is a side view of the present invention, showing a power tool supported on the extended status of the mobile power tool stand.
Figure 12:
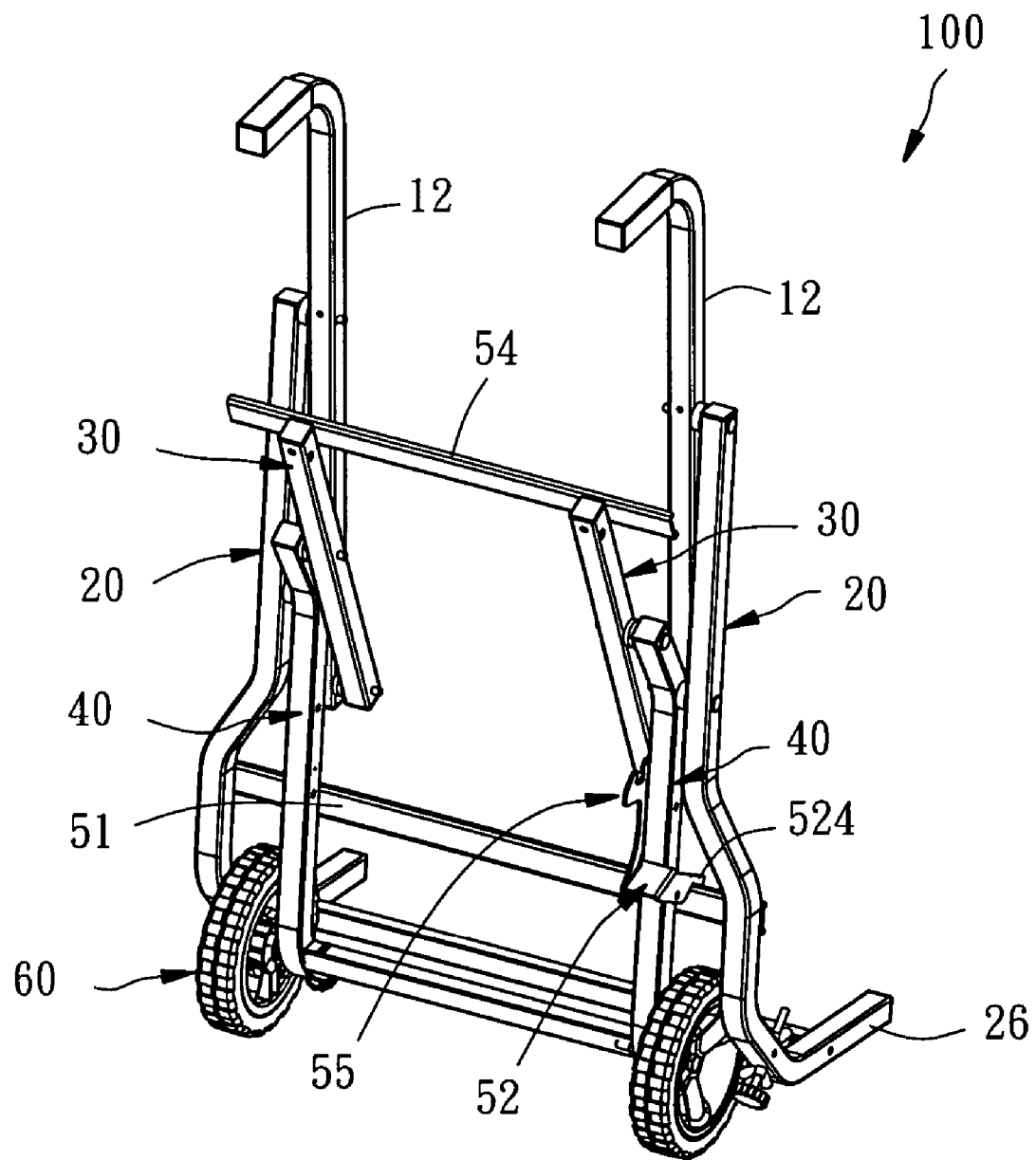
FIG. 12 is a perspective view showing the received status of the mobile power tool stand according to the present invention.

Referring to FIG. 3, a mobile power tool stand 100 is shown alternatively settable between an extended status to support a power tool 200, for example, a table saw as shown in FIG. 4, and a received status as shown in FIG. 12.

The mobile power tool stand 100 comprises a supporting structure 10, a pair of first legs 20, a pair of links 30, a pair of second legs 40, a locking structure 50, a pair of wheels 60, and an elevation adjustment unit 70.

The supporting structure 10 comprises two transverse bars 12 and two grips 14. The transverse bars 12 support the power tool 200, each having a first end 121 and a second end 122. The two grips 14 are respectively fixedly fastened to the first ends 121 of the transverse bars 12 and extending downwards.

The first legs 20 each have a top end provided with a first fulcrum 22 that is pivoted to one transverse bar 12 between the first end 121 and second end 122, and a bottom end terminating in a first curved section 24 and a second curved section 26, as shown in FIG. 4. The second curved section 26 is curving outwards and upwards.

The links 30 each are provided with a second fulcrum 32 respectively pivoted to the second ends 122 of the transverse bars 12.

The second legs 40 each have a first pivot point 42 and a second pivot point 44. The first pivot point 42 is pivoted to a middle part of one link 30. The second pivot point 44 is pivoted to one first leg 20. Further, one of the second legs 40 is provided with a first through hole 46 and a second through hole 48 for the mounting of the locking structure 50.

Figure 5:
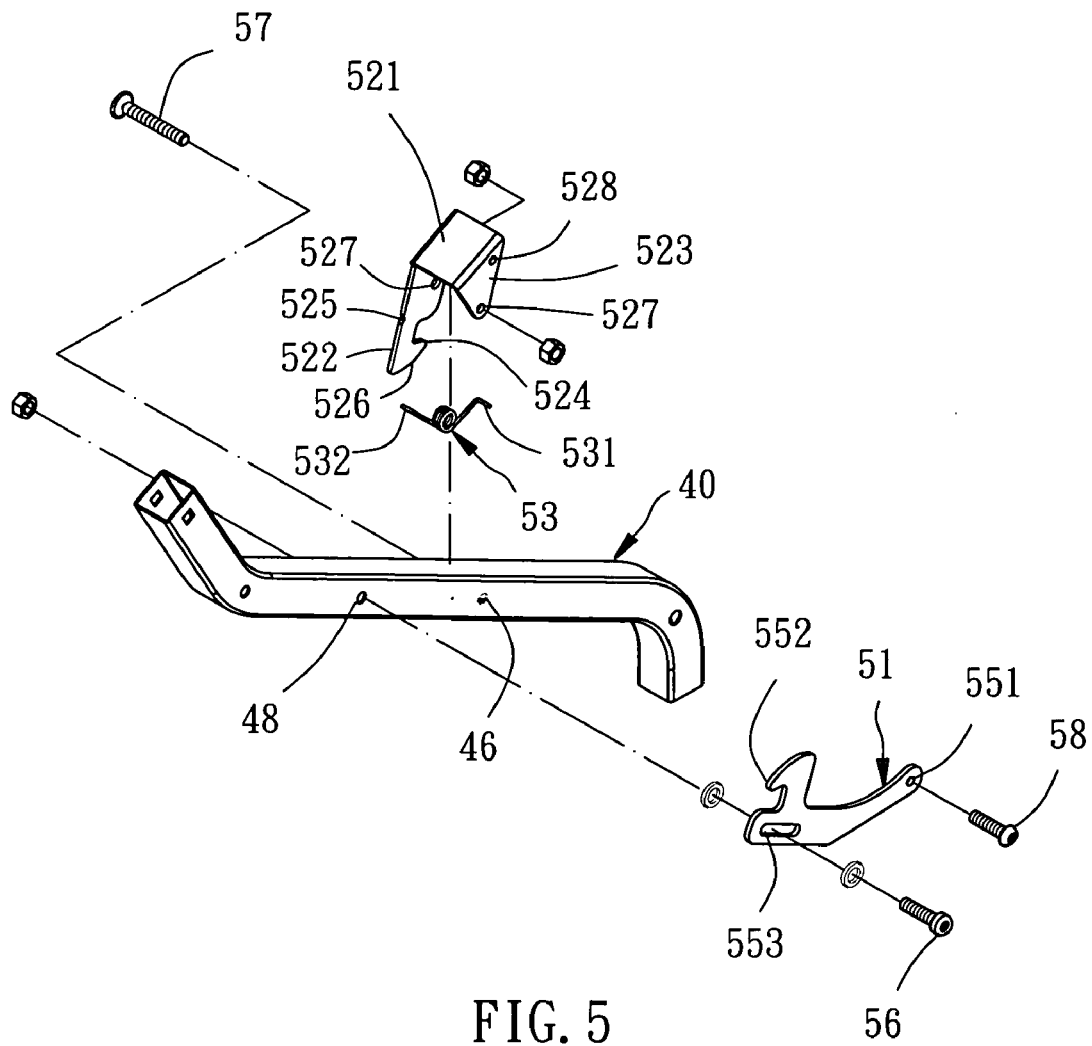
FIG. 5 is an exploded view of a part of the locking structure of the mobile power tool stand according to the present invention.
Figure 6:
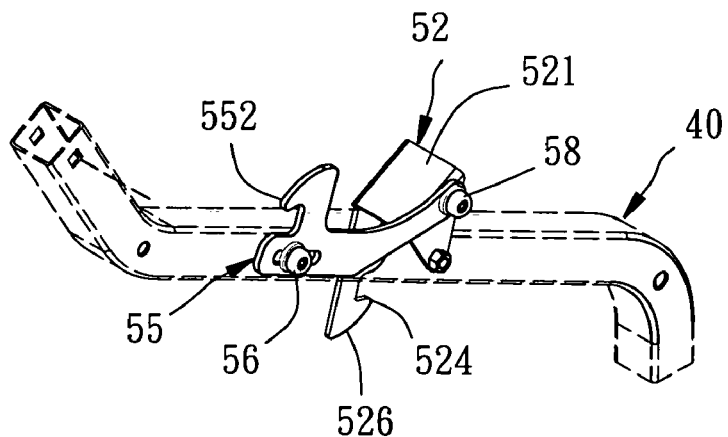
FIG. 6 is a schematic assembly view of FIG. 5.

Referring to FIGS. 3, 5 and 6, the locking structure 50 comprises a first locating member 51, a first retaining device 52, a biasing member 53, a second locating member 54, a second retaining device 55, a guide pin 56, and two pivot pins 57 and 58.

The first locating member 51 is a beam connected between the first legs 20 to enhance the stabilization of the first legs 20.

The first retaining device 52 comprises a footplate 521, a first sideboard 522, and a second sideboard 523. The first sideboard 522 and the second sideboard 523 are respectively downwardly extending from two opposite lateral sides of the footplate 521. The first sideboard 523 has a hook 524, and a notch 525, and a bevel edge 526. Further, two first pivot holes 527 are respectively formed at the sideboards 522 and 523; a second pivot hole 528 is provided at the second sideboard 523. The pivot pin 57 is inserted through the two first pivot holes 527 and the first through hole 46 to pivotally secure the first retaining device 52 to the second leg 40 having the said first through hole 46.

The biasing member 53 is a torsional spring mounted on the pivot pin 57, having a first end 531 fastened to the second leg 40 having the said first through hole 46 and a second end 532 fastened to the notch 525 of the first side board 523 of the first retaining device 52.

The second locating member 54 is a beam connected between the rear ends of the links 30.

The second retaining device 55 is an elongated plate member having a pivot hole 551 at one end, an elongated sliding slot 553 at the other end, and a hook 552 adjacent to the elongated sliding slot 553. The pivot pin 58 is inserted through the pivot hole 551 of the second retaining device 55 and the second pivot hole 528 of the first retaining device 52 to pivotally secure the second retaining device 55 to the first retaining device 52.

The guide pin 56 is inserted through the elongated sliding slot 553 of the second retaining device 55 and the second through hole 48 of the respective second leg 40 to guide movement of the second retaining device 55 linearly forwards/backwards.

The wheels 60 are respectively pivoted to the second legs 40 near the rear ends.

Figure 7:
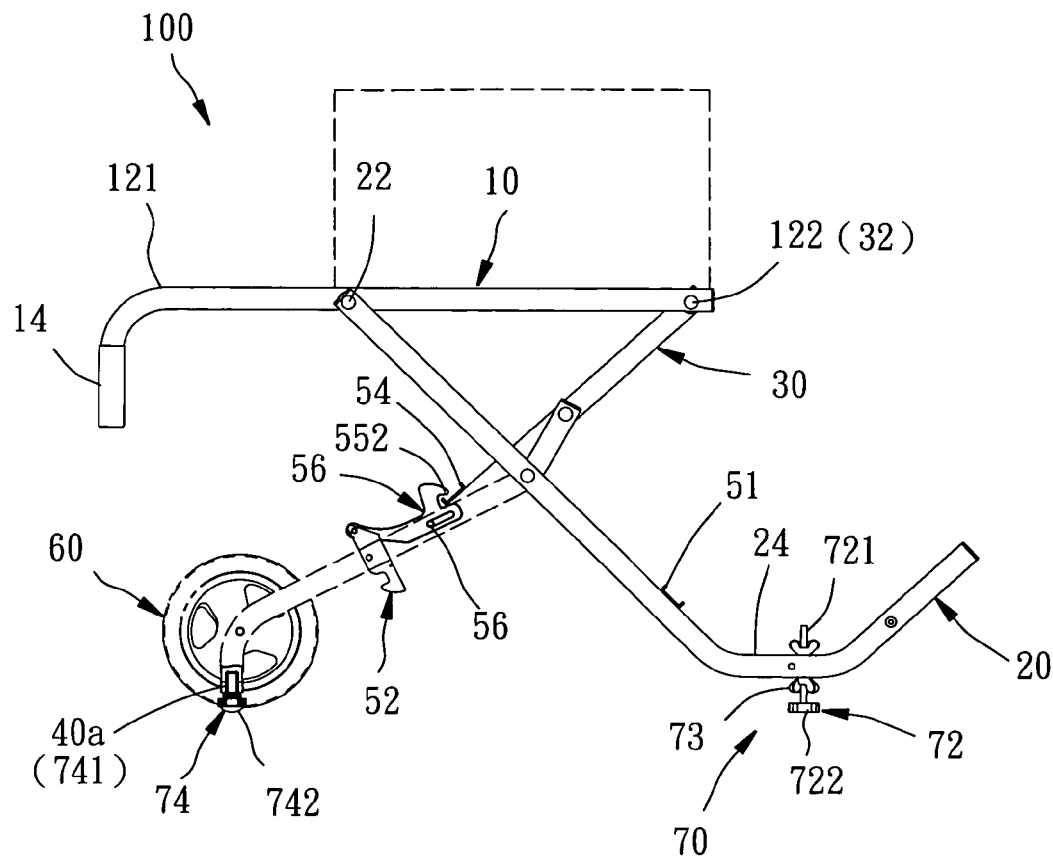
FIG. 7 is a schematic side view of the present invention showing the extended status of the mobile power tool stand.

The elevation adjustment unit 70 comprises two first adjustment devices 72 respectively installed in the first legs 20, and two second adjustment devices 74 respectively installed in the second legs 40. Referring also to FIG. 7, each first adjustment device 72 comprises a screw rod 721, which is threaded through the first curved section 24 of the respective first leg 20 and has a head 722 at the bottom side, and a locknut 73, which is fastened to the screw rod 721 and rotatable to adjust the elevation of the head 722 of the screw rod 721 and to further correct the horizontal status of the mobile power tool stand 100. The second adjustment device 74 has a screw rod 41 directly threaded into the bottom screw hole 40a of the respective second leg 40 and rotatable to correct the horizontal status of the power tool stand 100.

FIG. 7 shows the extended status of the mobile power tool stand 100. At this time, the hook 552 of the second retaining device 55 is hooked on the second locating member 54, locking the mobile power tool stand 100 in the extended position.

Figure 8:
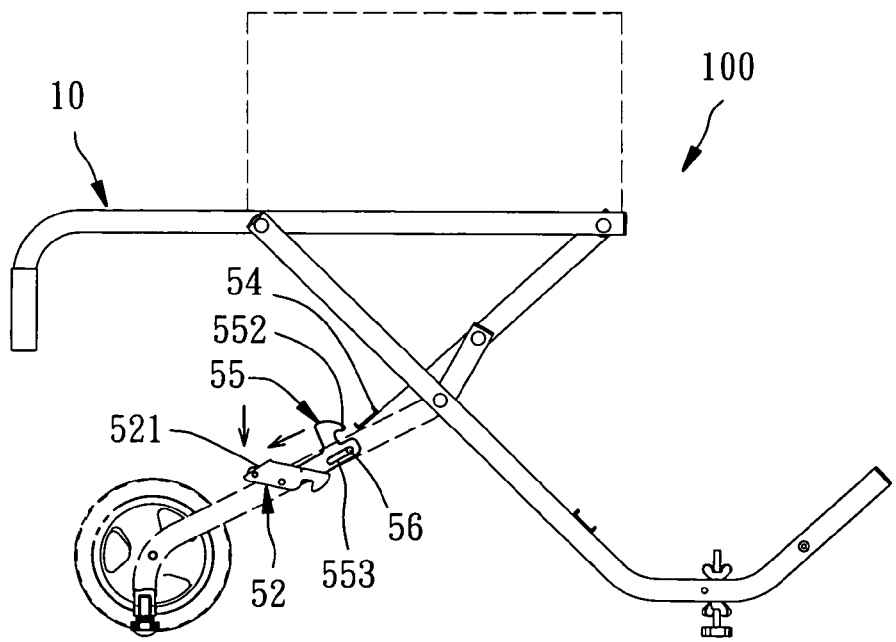
FIGS. 8-11 show the actions of the present invention from the extended status to the received status.
Figure 9:
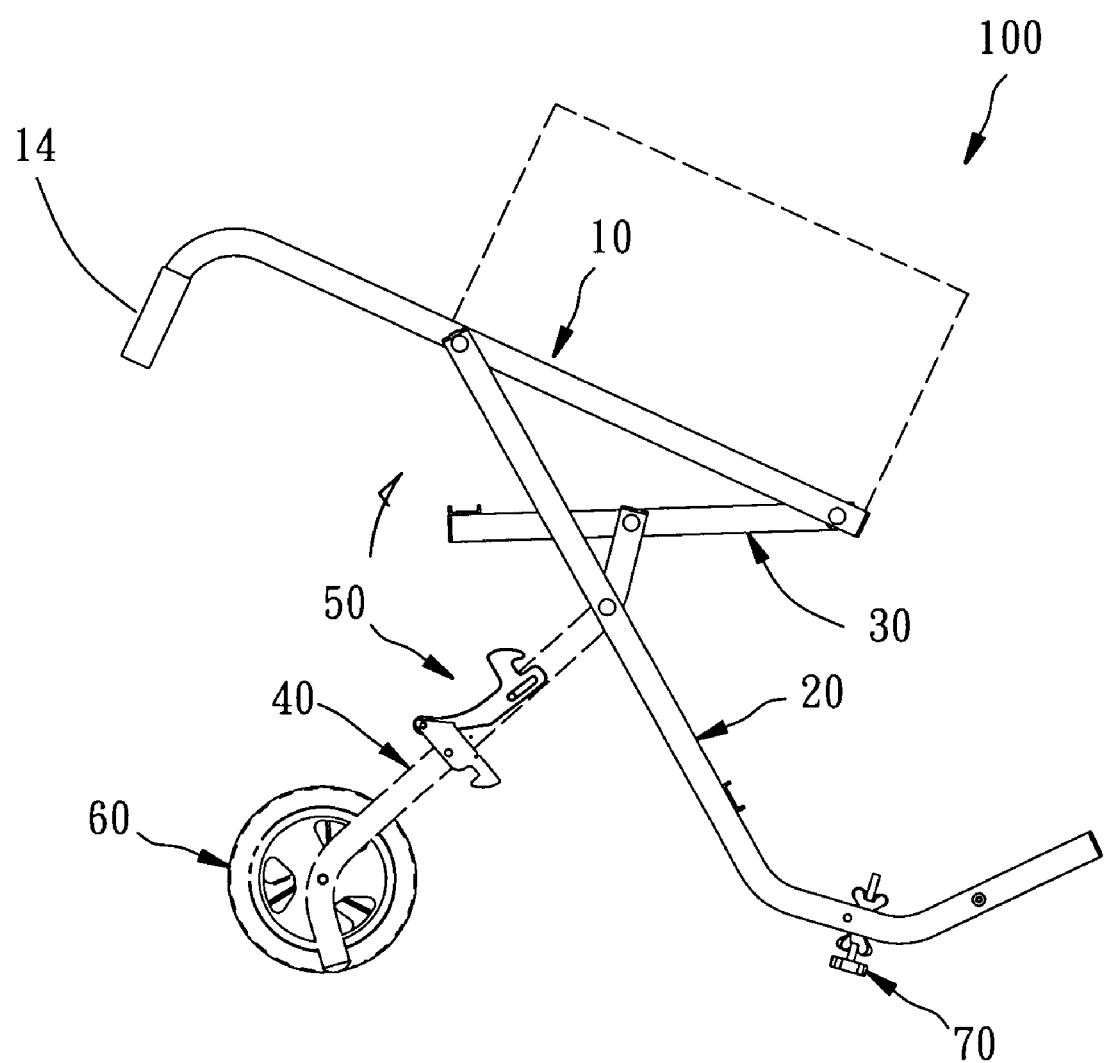
Figure 11:
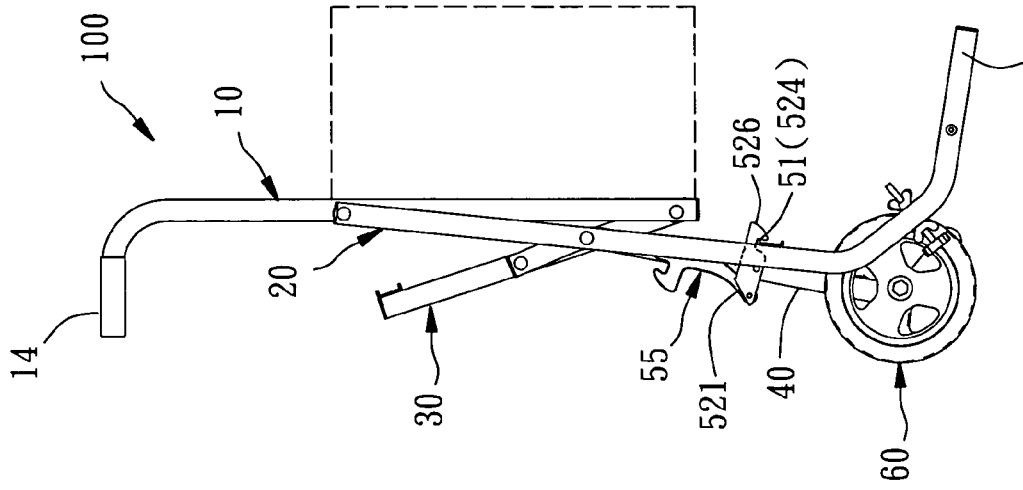
Figure 10:
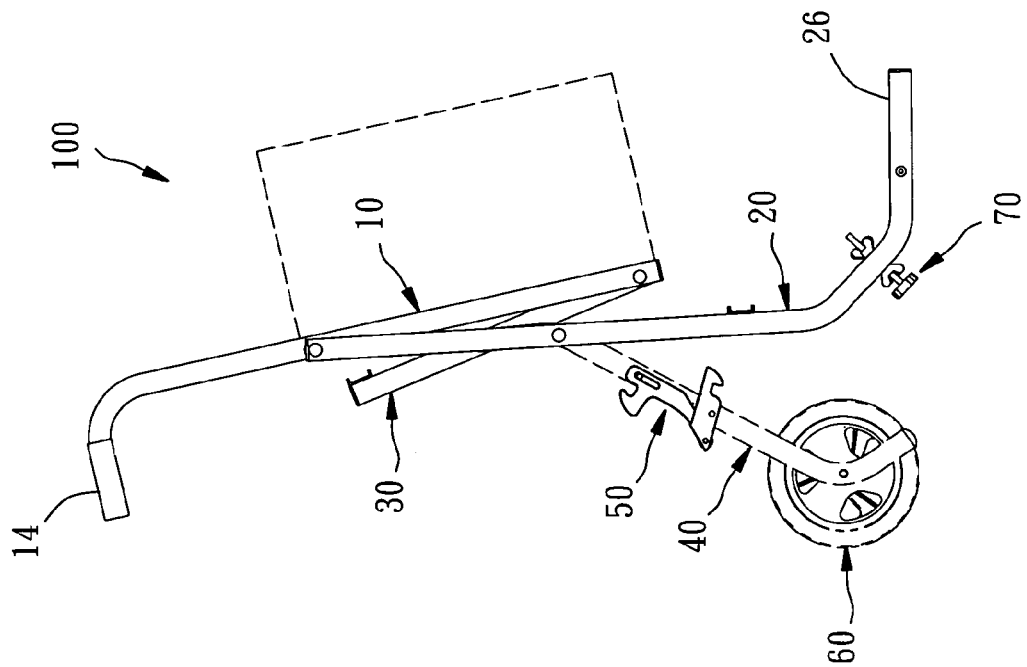

The receiving operation of the mobile power tool stand 100 is described hereinafter with reference to FIGS. 8-12. When the user pressed the foot plate 521 of the first retaining device 52 with the foot, the second retaining device 55 is turned backwards to disengage the hook 552 from the second locating member 54 as shown in FIG. 8. At this time, the user can pull the grips 14 upwards to shift the center of gravity of the mobile power tool stand 100 to the first legs 20 and to simultaneously move the second legs 40 toward the first legs 20 due to the effect of the links 30, enabling the second curved sections 26 of the first legs 20 to be supported on the floor. FIGS. 11 and 12 show the second legs 40 almost closed to the first legs 20. At this time, the bevel edge 526 of the first retaining device 52 touches the first locating member 51 at first to guide the hook 524 upwards. Thereafter, the first retaining device 52 is forced by the biasing member 53 to turn downward in clockwise direction and to further hook on the first locating member 51. Thus, the parts of the mobile power tool stand 100 are prohibited from movement relative to one another.

Figure 13:
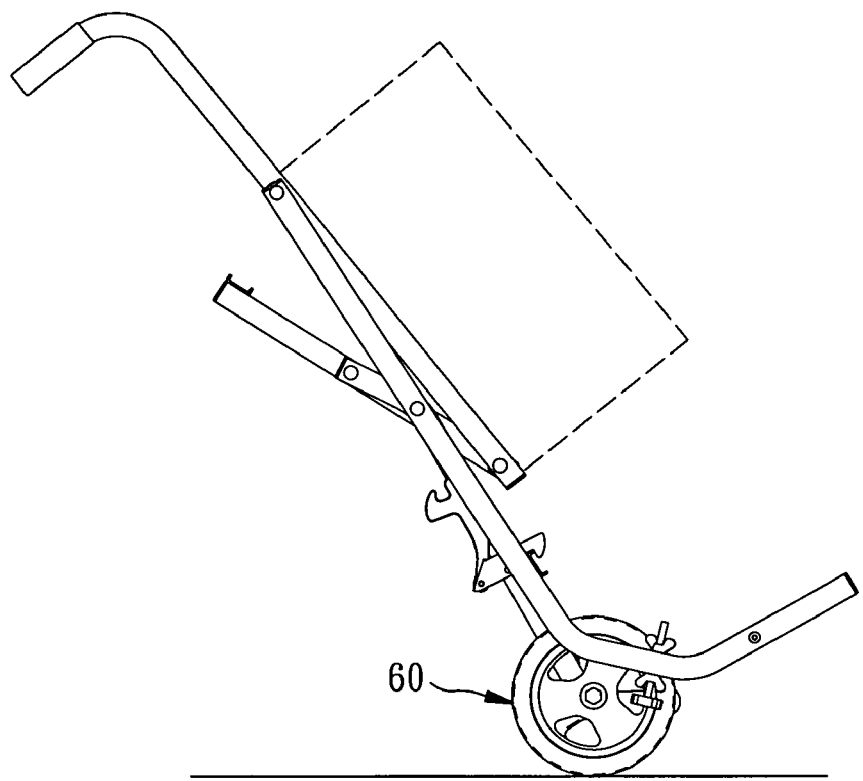
FIG. 13 is a schematic drawing of the present invention, showing the wheels moved with the mobile power tool stand on the floor.
Figure 14:
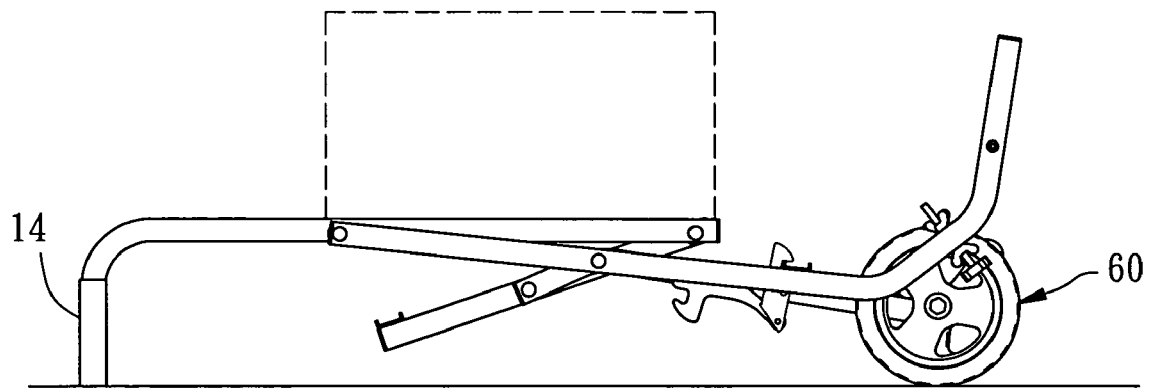
FIG. 14 shows the received status of the mobile power tool stand with the grips and the wheels rested on the floor according to the present invention.

FIG. 13 shows the mobile power tool stand 100 moved on the floor by means of the wheels 60. FIG. 14 shows the received status of the mobile power tool stand 100 with the grips 14 and the wheels 60 rested on the floor. By means of pulling the grips 14 vertically upwards, the user can easily lift the mobile power tool stand 100 from the position shown in FIG. 14 to the position shown in FIG. 13.

During the process shown in FIGS. 8-11, the user can easily change the mobile power tool stand 100 from the extended status to the received status by oneself even if the mobile power tool stand 100 carries a power tool 200. Further, because each first leg 20 has a first curved section 24 and a second curved section 26 connected in series, the user can gradually tilt the power tool 200, preventing a sudden falling of the power tool 200. Further, because the first retaining device 52 and second retaining device 55 of the locking structure 50 are provided at the middle part of the respective second leg 40, they will not hinder any person around the mobile power tool stand 100. Therefore, the mobile power tool stand 100 is safe, stable and convenient in use.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A mobile power tool stand comprising:
   a supporting structure for holding a power tool on a top side thereof;
   a pair of first legs each having a fulcrum respectively pivoted to said supporting structure;
   a pair of links each having a fulcrum respectively pivoted to said supporting structure;
   a pair of second legs each having a first pivot point respectively pivoted to said links and a second pivot point respectively pivoted to said first legs; and
   a locking structure comprising a first locating member provided at said first legs, and a first retaining device provided at said second legs for fastening to said first locating member when said first legs are received to said second legs,
   wherein the first locating member of said locking structure is a beam connected between said first legs, and the first retaining device of said locking structure is pivoted to one of said second legs, having a foot plate disposed at one side thereof and a hook disposed at an opposite side thereof for hooking on said first locating member.

2. The mobile power tool stand as claimed in claim 1, wherein said supporting structure comprises two transverse bars arranged in parallel for holding the power tool, said transverse bars each having a first end and a second end; the fulcrums of said first legs are respectively pivoted to said transverse bars between the first ends and second ends of said transverse bars and the fulcrums of said links are respectively pivoted to said second ends of said transverse bars.

3. The mobile power tool stand as claimed in claim 2, wherein said supporting structure further comprises two grips respectively connected to the first ends of said transverse bars; wherein each of said first legs has a bottom end terminating in a first curved section and then a second curved section, said second curved section being curved outwards.

4. The mobile power tool stand as claimed in claim 1, wherein said locking structure further comprises a second locating member and a second retaining device, said second locating member being a beam connected between said links, said second retaining device comprising a connecting end pivoted to said first retaining device and a hook for hooking on said second locating member when said first legs and said second legs are relatively turned away from each other.

5. The mobile power tool stand as claimed in claim 4, wherein said locking structure further comprises an elongated sliding slot formed in said second retaining device, and a guide pin fixedly provided at one of said second legs and inserted through said elongated sliding slot.

6. The mobile power tool stand as claimed in claim 1, wherein said locking structure further comprises a biasing member, said biasing member having a first end connected to one of said second legs and a second end connected to said first retaining device.

7. The mobile power tool stand as claimed in claim 1, further comprising two wheels respectively pivoted to said second legs.

8. A mobile power tool stand comprising:
  a supporting structure for holding a power tool on a top side thereof;
  a pair of first legs each having a fulcrum respectively pivoted to said supporting structure;
  a pair of links each having a fulcrum respectively pivoted to said supporting structure;
  a pair of second legs each having a first pivot point respectively pivoted to said links and a second pivot point respectively pivoted to said first legs; and
  a locking structure comprising a first locating member provided at said first legs, and a first retaining device provided at said second legs for fastening to said first locating member when said first legs are received to said second legs; and
  an elevation adjustment structure, said elevation adjustment structure comprising a first adjustment member fastened to said first legs for supporting said first legs on the floor when said first legs and said second legs are moved apart, said adjustment member being adjustable to change the connection position relative to said first legs.

9. The mobile power tool stand as claimed in claim 8, wherein said elevation adjustment structure further comprising a second adjustment member fastened to said second legs and adjustable to change the connection position relative to said second legs.

10. A mobile power tool stand comprising:
  a pair of transverse bars arranged in parallel, said transverse bars each having a first end and a second end;
  a pair of first legs each having a top end provided with a fulcrum respectively pivoted to said transverse bars between the first ends and second ends of said transverse bars, and a bottom end terminating in a first curved section and a second curved section, said second curved section being curved outwards;
  a pair of links each having a fulcrum respectively pivoted to the second ends of said transverse bars;
  a pair of second legs each having a first pivot point respectively pivoted to said links and a second pivot point respectively pivoted to said first legs;
  wherein said first legs and said second legs are relatively movable between a first position where said first legs and said second legs are received together to hold the mobile power tool stand in a received status, and a second position where said first legs and said second legs are set apart to support the mobile power tool stand in an extended position to support a power tool on said supporting structure,
  a locking structure, said locking structure comprising a first locating member installed in said first legs and a first retaining device installed in said second legs and connectable to said first locating member to hold the mobile power tool stand in said received status,
  wherein said first locating member is a beam connected between said first legs, and said first retaining device is pivoted to one of said second legs, having a foot plate disposed at one side thereof and a hook disposed at an opposite side thereof for hooking on said first locating member.

11. The mobile power tool stand as claimed in claim 10, further comprising two wheels respectively pivoted to said second legs.

12. The mobile power tool stand as claimed in claim 10, wherein said locking structure further comprises a second locating member and a second retaining device, said second locating member being a beam connected between said links, said second retaining device having a connecting end pivoted to said first retaining device and a hook for hooking on said second locating member to hold the mobile power tool stand in said extended status.

13. The mobile power tool stand as claimed in claim 12, wherein said locking structure further comprising an elongated sliding slot formed in said second retaining device, and a guide pin fixedly provided at one of said second legs and inserted through said elongated sliding slot.

14. The mobile power tool stand as claimed in claim 10, wherein said locking structure further comprising a biasing member, said biasing member having a first end connected to one of said second legs and a second end connected to said first retaining device.

15. A mobile power tool stand comprising:
  a pair of transverse bars arranged in parallel, said transverse bars each having a first end and a second end;
  a pair of first legs each having a top end provided with a fulcrum respectively pivoted to said transverse bars between the first ends and second ends of said transverse bars, and a bottom end terminating in a first curved section and a second curved section, said second curved section being curved outwards;
  a pair of links each having a fulcrum respectively pivoted to the second ends of said transverse bars;
  a pair of second legs each having a first pivot point respectively pivoted to said links and a second pivot point respectively pivoted to said first legs;
  wherein said first legs and said second legs are relatively movable between a first position where said first legs and said second legs are received together to hold the mobile power tool stand in a received status, and a second position where said first legs and said second legs are set apart to support the mobile power tool stand in an extended position to support a power tool on said supporting structure; and an elevation adjustment structure, said elevation adjustment structure comprising a first adjustment member fastened to said first legs for supporting said first legs on the floor when said first legs and said second legs are moved apart, said adjustment member being adjustable to change the connection position relative to said first legs.

16. The mobile power tool stand as claimed in claim 15, wherein said elevation adjustment structure further comprising a second adjustment member fastened to said second legs and adjustable to change the connection position relative to said second legs.

* * * * *